March 6, 1945.  J. R. O'DONNELL  2,370,748
HINGED CLAMP
Filed April 12, 1943  2 Sheets-Sheet 1
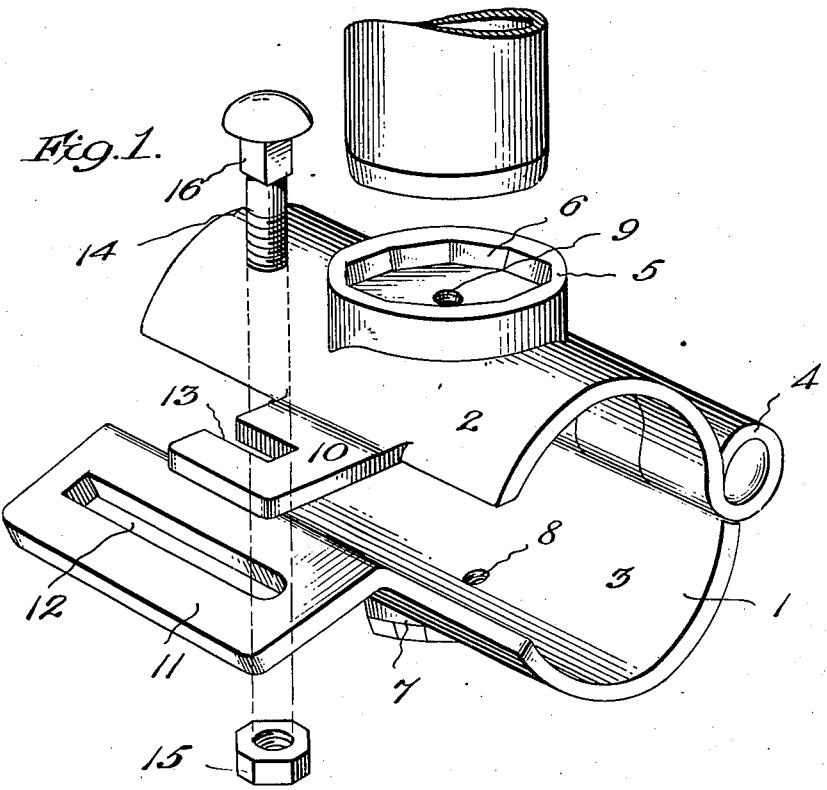
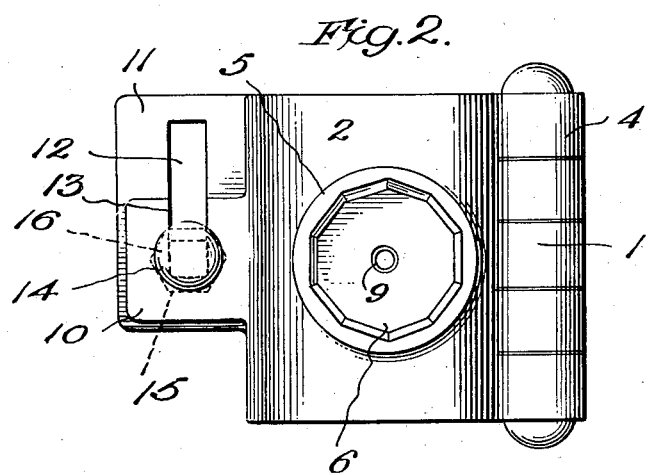
INVENTOR.
JOHN R. O'DONNELL
BY
ATTORNEY March 6, 1945.  J. R. O'DONNELL  2,370,748
HINGED CLAMP
Filed April 12, 1943  2 Sheets-Sheet 2
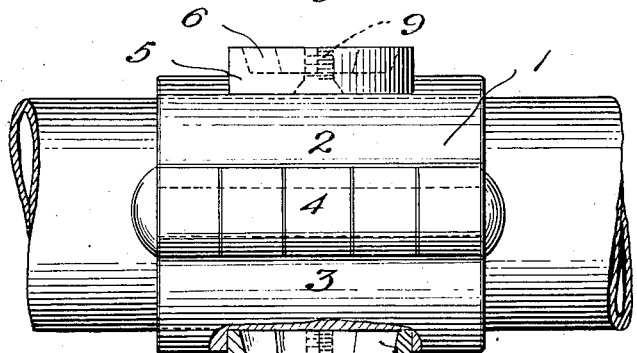
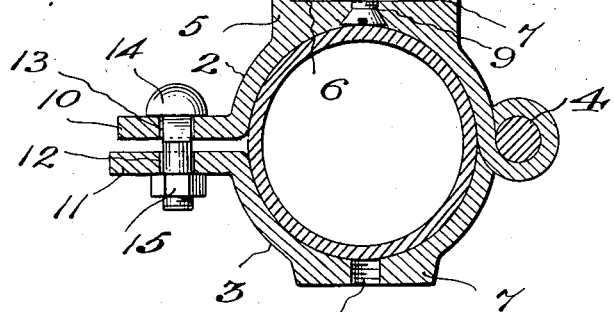
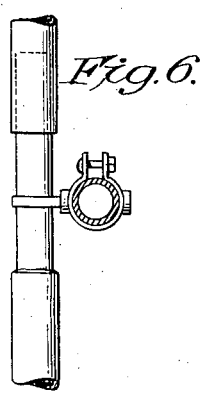
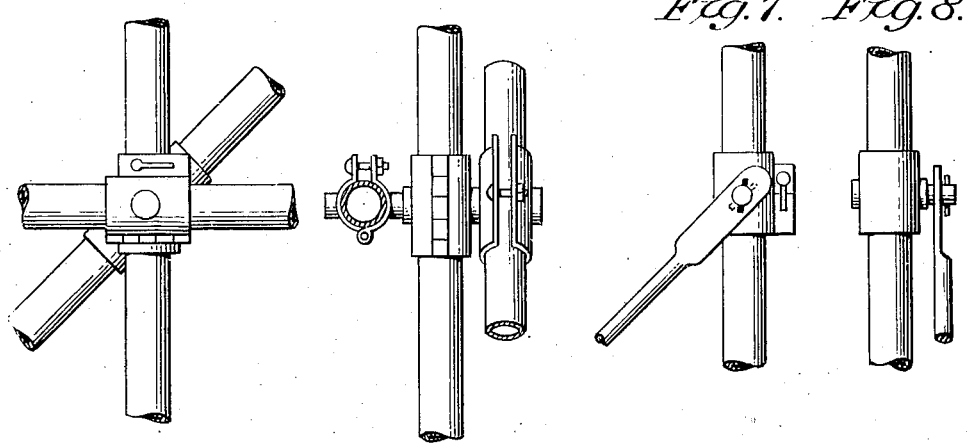
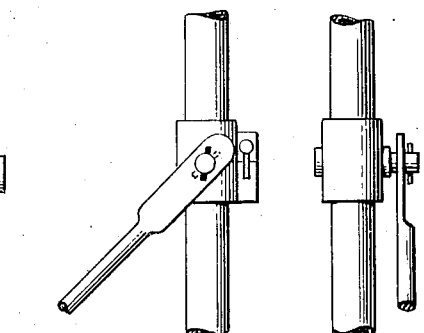
INVENTOR.
JOHN R. O'DONNELL
BY
ATTORNEY Patented Mar. 6, 1945

2,370,748

UNITED STATES PATENT OFFICE 2,370,748

HINGED CLAMP

John R. O'Donnell, Brooklyn, N. Y., assignor to Econo Safety Devices, Inc., Maspeth, N. Y., a corporation of New York Application April 12, 1943, Serial No. 482,705

2 Claims. (Cl. 24—83)

The present invention relates to a clamp, and more particularly, the present invention relates to a single hinged, two-leaf clamp adapted to be attached to pipes.

Two-leaf, hinged clamps are well known. Various types are used for hanging pipes from ceilings, to attach pipes to other pipes for providing structural supports, supports for scaffolding, and the like. Single hinged clamps having outlets designed to hold hanger rods and other fittings are also well-known. Finally, double clamps adapted to fasten pipes at right angles to each other, have also been used. Various means have been employed to tighten the clamps about pipes. Among the more widely used, in addition to a separate bolt and nut arrangement adapted to grip two jaws on the clamp to tighten the clamp about a pipe, are the well-known wedge arrangement and the hinged or pivoted bolt arrangement. The disadvantages of the separate bolt and nut and of the wedge arrangement are obvious. However, where the hinged or pivoted bolt arrangement has been used, the most common defect has been that the bolt was too long. This disadvantageous length was necessary to permit the hinged bolt to swing clearly to the opposite surface of the jaw to provide a sufficient length of thread on the bolt to take a nut. The usual practice was to screw the nut on the threaded end of the bolt for at least one inch before the nut and bolt cooperated with the jaw to tighten the clamp about the pipe. The exposed threaded portion of the bolt was a source of danger to workmen and workmen's clothes and the common practice was to cover it with hemp bags. In spite of this precaution, workmen's clothes still were torn and the thread was stripped. Periodically, the stripped thread had to be repaired by rethreading the bolt.

Although many attempts have been made to remedy the aforementioned shortcomings, none, as far as I am aware have been entirely successful when carried into practice commercially.

I have discovered that the prior art shortcomings can be avoided by providing a single hinged, two-leaf clamp which can be attached to pipes by means of a separate bolt and nut, in which the bolt and nut cooperate with structural elements of the clamp, whereby the clamp can be tightened about pipes with but few turns of the nut, and in which substantially no threaded portion of the bolt protrudes beyond the nut.

I have found that the bolt and nut may be placed loosely on the clamp for ready operation and that the clamp may be used to provide means whereby other fittings or pipes may be attached to the pipe about which the clamp is mounted.

It is an object of the present invention to provide a single hinged, two-leaf clamp adapted to be attached to pipes in a simple, efficient and economical manner.

It is another object of the present invention to provide a clamp that can be attached to pipes by means of cooperating bolt and nut arrangement that can be made a part thereof and which can tighten the clamp about pipes with but a few turns of the nut.

It is also an object of the present invention to provide a clamp adapted to be attached to pipe having means to permit subsequent attachment of other fittings or pipes to the pipe to which it is attached.

It is a further object of the present invention to provide a clamp adapted to be attached to pipes having means to permit subsequent attachment of similar clamps to itself.

Other objects and advantages of the present invention will become apparent to those skilled in the art from the following description taken in conjunction with the accompanying drawings, in which:

Fig. 1 is a perspective view of a clamp embodying the present invention, with the bolt and nut detached;

Fig. 2 is a plan view of the clamp shown in Fig. 1, but with the nut and bolt attached;

Fig. 3 is a view of two clamps shown partly in section and similar to the clamp shown in perspective in Fig. 1, attached to pipes and connected to produce a pipe structure in which one pipe is connected to the other at right angles thereto; and Figs. 4, 5, 6, 7 and 8 are views showing various applications of the clamp shown in perspective in Fig. 1 to produce various types of pipe structures.

Broadly stated, the present invention provides a clamp comprising two hinged leaves, one of the leaves having means on the outer surface thereof adapted to receive the end of a tubular member, and the other of the leaves having means on the outer surface thereof adapted to be inserted into means similar to that on the surface of the other leaf, the leaves having a pair of jaws adapted to cooperate with a nut and bolt arrangement whereby the clamp may be tightened and attached to a tubular member.

In another modification, the clamp leaves may have hubs on the surfaces thereof adapted to fit into the openings of braces, the braces being kept from slipping by nails placed through openings in the outer zones of the hubs.

The invention will now be described in connection with a preferred embodiment designated generally by reference character 1 in Fig. 1, but it is to be distinctly understood that the invention is applicable to clamps of any desired geometrical shape and to clamps adapted to the production and fabrication of any type of tubular structure.

Referring now more particularly to Figs. 1 and 2, the clamp 1 may consist of two leaves 2 and 3 suitably hinged together at 4. The two leaves 2 and 3 may be semi-circular in shape or cross-section if the clamp is to be attached to cylindrical pipes or may be of any desired shape in cross-section, the shape or cross-section of the tubular member to which the clamp is to be attached being the criteria in determining the cross-section of the leaves.

One of the leaves 2 has a projection 5 on its outer surface and the projection 5 has a recess 6 adapted to receive the end of a tubular element or a projection 7 similar to the projection on the surface of the other leaf 3. The inner surface of the recess 6 and the outer surface of the projection 7 may be fluted to prevent any relative motion between the projection 7 and the recess 6. To secure the projection 7 into the recess 6, the projection and recess may be provided with threaded holes 8 and 9 respectively, which are juxtaposed when a projection of a similar clamp is brought into the recess and are adapted to receive a screw to rigidly secure the two parts together. In this manner, it is possible to connect two clamps together as shown in Fig. 3 and by placing the projection 7 in the recess in a predetermined position, it is possible to so dispose the other clamp, that a pipe or tubular element may be attached to the pipe or tubular element held by the first clamp, in any one of a number of angular positions. Obviously, these clamps will have a recess 6 and a projection 7 still available for connection to other similar clamps to obtain any desired tubular structure as shown in Figs. 4 and 5.

The unhinged edges of the leaves 2 and 3 are provided with extensions 10 and 11 which are adapted to be juxtaposed when the clamp is in the closed position. One of the extensions 11 is provided with an elongated slot 12 adapted to receive the shank of a bolt 14 and the other extension 10 is provided with an open-end or U-shaped slot 13 likewise adapted to receive the shank of the bolt 14. When the clamp is in the closed position, the shank of the bolt 14 will bridge the U-shaped slot 13 and the elongated opening 12 and will project below the latter so that the clamp can be locked into the closed position by threading the nut 15 onto the threaded end of the bolt 14.

The bolt 14 is provided with a shank which is partly square in cross-section under the head. This part of the shank 16 prevents the bolt 14 from turning when the nut 15 is turned to loosen or tighten the bolt 14, by engaging the surface of the U-shaped slot 13 in extension 10.

In a modification of the clamp embodying the present invention, the surface of one or both leaves may be provided with hubs or projections adapted to fit into openings at the flattened extremities of braces as shown in Figs. 7 and 8. The outer zones of these hubs are provided with holes transversely to the axes of the hubs adapted to receive pins to prevent the openings in the braces from slipping.

In another modification of the clamp, the surface of one or both leaves may be fitted with a pipe ring as shown in Fig. 6. The ring fitting may be slipped over a pipe dowel and the latter welded inside of a pipe post. These posts ordinarily are supplied in uniform lengths and in use are staked one upon another and held in place by slipping the bottom of one post over the dowel extending from the top of another post. The ring fittings fit tightly between the top of the lower post and the bottom of the upper post.

Although the present invention has been described in conjunction with preferred embodiments, it is to be understood that modifications and variations may be resorted to without departing from the spirit and scope of the invention, as those skilled in the art will readily understand. Such variations and modifications are considered to be within the purview and scope of the appended claims.

I claim:

1. A clamp adapted to frictionally embrace a portion of the surface of a tubular member to be removably secured thereto, which comprises a pair of leaves shaped and disposed along their axial edges to substantially conform with the outer surface of said tubular member, said leaves being hinged along one pair of adjacent axial edges to open and close about said tubular member, the outer surface of one of said pair of leaves having a recess therein, a projection on the outer surface of the other of said pair of leaves adapted to engage into said recess on another of said clamps, means to rigidly secure said projection into said recess, an extension projecting from the unhinged axial edge of one of said pair of leaves having an elongated opening therein, a nut and bolt arrangement removably mounted in said elongated opening, and an extension projecting from the unhinged axial edge of the other of said pair of leaves having a U-shaped slot therein, said extensions being disposed and said U-shaped slot and said elongated opening being positioned so that when the leaves are closed, the U-shaped slot and the elongated opening are juxtaposed; whereby, the shank of the bolt may be swung into the U-shaped slot and the leaves may be tightened about said tubular member with said nut.

2. A clamp adapted to frictionally embrace a portion of the surface of a tubular member to be removably secured thereto, which comprises a pair of leaves shaped and disposed along their axial edges to substantially conform with the outer surface of said tubular member, said leaves being hinged along one pair of adjacent axial edges to open and close about said tubular member, an extension projecting from the unhinged axial edge of one of said pair of leaves having an elongated opening therein, a nut and bolt arrangement removably mounted in said elongated opening, and an extension projecting from the unhinged axial edge of the other of said pair of leaves having a U-shaped slot therein, said extensions being disposed and said U-shaped slot and said elongated opening being positioned so that when the leaves are closed, the U-shaped slot and the elongated opening are juxtaposed; whereby, the shank of the bolt may be swung into the U-shaped slot and the leaves may be tightened about said tubular member with said nut.

JOHN R. O'DONNELL.